US 8,473,849 B2

(12) United States Patent
Miwa

(10) Patent No.: US 8,473,849 B2
(45) Date of Patent: Jun. 25, 2013

(54) APPARATUS AND METHOD FOR TRANSMITTING IMAGE DATA, AND COMPUTER-READABLE STORAGE MEDIUM FOR COMPUTER PROGRAM

(75) Inventor: Haruna Miwa, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 588 days.

(21) Appl. No.: 12/715,440

(22) Filed: Mar. 2, 2010

(65) Prior Publication Data

US 2010/0229109 A1 Sep. 9, 2010

(30) Foreign Application Priority Data

Mar. 3, 2009 (JP) ................. 2009-049004

(51) Int. Cl.
*G06F 3/00* (2006.01)
(52) U.S. Cl.
USPC ........................................ 715/747
(58) Field of Classification Search
USPC .......................... 715/744, 745, 747
See application file for complete search history.

(56) References Cited

U.S. PATENT DOCUMENTS

2003/0050893 A1* 3/2003 Hirabayashi ............ 705/52

FOREIGN PATENT DOCUMENTS

| JP | 11-69072 A | 3/1999 |
|---|---|---|
| JP | 2000-261494 | 9/2000 |
| JP | 2001-197248 A | 7/2001 |
| JP | 2003-085069 | 3/2003 |
| JP | 2003-141045 | 5/2003 |
| JP | 2004-200737 | 7/2004 |
| JP | 2005-267178 | 9/2005 |
| JP | 3719006 | 11/2005 |
| JP | 2006-5491 A | 1/2006 |
| JP | 2006-279641 | 10/2006 |
| JP | 4051938 | 2/2008 |

OTHER PUBLICATIONS

D. Wing, "Indicating Supported Media Features Using Extensions to DSN and MDN" U.S.A., IETF, Mar. 1999, RFC-2530, URL, http://www.rfc-editor.org/rfc/pdfrfc/rfc2530.txt.pdf., pp. 1-5.
Office Action (Notification of Reason(s) for Refusal) dated Nov. 16, 2010, issued in the corresponding Japanese Patent Application No. 2009-049004, and an English Translation thereof.

* cited by examiner

*Primary Examiner* — Thanh Vu
(74) *Attorney, Agent, or Firm* — Buchanan Ingersoll & Rooney PC

(57) ABSTRACT

An image forming apparatus is provided with a first electronic mail message transmission portion for transmitting an image file of a target image to be transmitted to an intended receiver to an apparatus of the intended receiver together with a URL of a web page on which an image format is specified, a second transmission image data generation portion for generating an image file of the target image in the format specified on the web page, and a second electronic mail message transmission portion for transmitting the image file thus generated to the apparatus of the intended receiver.

18 Claims, 17 Drawing Sheets

| USER CODE | DESIRED FORMAT | CONDITION | ELECTRONIC MAIL ADDRESS | LEVEL | |
|---|---|---|---|---|---|
| Y001 | PDF | | aaa@xx.yy.zzz | A | ~5U |
| Y002 | TIFF | MONOCHROME | bbb@xyz.ac.xxx | B | ~5U |
| Y003 | PDF | 400dpi, MONOCHROME | ccc@mail.zzz.co.xxx | B | ~5U |
| Y004 | GIF | | ddd@yyy.co.xxx | A | ~5U |
| Y005 | JPEG | CHARACTER | eee@ppp.or.xxx | A | ~5U |
| ⋮ | ⋮ | ⋮ | ⋮ | ⋮ | |

FIG. 5

```
SPECIFY CONDITIONS FOR SCAN TO E-MAIL.

ELECTRONIC MAIL  ┌─────────────────────┐
         ADDRESS OF RECEIVER └─────────────────────┘
─────────────────────────────────────────────────────
         FORMAT USED WHEN NO FORMAT IS SPECIFIED BY
                     INTENDED RECEIVER

● PDF      ○ TIFF      ○ JPEG      ○ GIF
─────────────────────────────────────────────────────
                         RESOLUTION

○ 200dpi   ● 300dpi   ○ 400dpi    ○ 600dpi

┌───────┐
                                      │ APPLY │
                                      └───────┘
```

> ATTACHED PLEASE FIND A DOCUMENT FOR THE NEXT MEETING.
> THE DOCUMENT CONTAINS 5 PAGES INCLUDING THE COVER SHEET.
> PLEASE READ THE DOCUMENT BEFORE THE NEXT MEETING.
>
> TO CHANGE THE FORMAT TO ANOTHER FORMAT, PLEASE CLICK ON THE FOLLOWING URL TO ACCESS THE SETTING PAGE.
>
> http://www.domain-a.co.xxx/setting.html?file=080121001&address=aaa@xx.yy.zzz

| FILE NAME | ELECTRONIC MAIL ADDRESS | NUMBER OF OCCURRENCES | |
|---|---|---:|---|
| 080121001 | aaa@xx.yy.zzz | 1 | ~5L |
| 080121002 | ccc@mail.zzz.co.xxx | 1 | ~5L |
| 080121003 | xyz@sss.or.xxx | 1 | ~5L |
| 080121101 | bbb@xyz.ac.xxx | 1 | ~5L |
| 080121102 | xyz@sss.or.xxx | 1 | ~5L |
| 080121003 | xyz@sss.or.xxx | 2 | ~5L |
| ⋮ | ⋮ | ⋮ | |

FIG. 10

```
┌─────────────────────────────────────────────────────────┐
│ ╱ FORMAT ╲                                              │
│                                                         │
│           PLEASE SPECIFY DESIRED FORMAT.                │
│                                                         │
│     ○ PDF       ● TIFF      ○ JPEG      ○ GIF           │
│                                                         │
│                                                         │
│                                          ┌───────┐      │
│                                          │ APPLY │      │
│                                          └───────┘      │
└─────────────────────────────────────────────────────────┘
                                              │
                                            WN31
```

FIG. 11

| FORMAT | RESOLUTION | SINGLE-SIDED/ DOUBLE-SIDED | COLOR/ MONOCHROME | SCAN SIZE | IMAGE QUALITY |

PLEASE SPECIFY DESIRED FORMAT.

○ PDF     ● TIFF     ○ JPEG     ○ GIF

APPLY

| FORMAT | RESOLUTION | SINGLE-SIDED/ DOUBLE-SIDED | COLOR/ MONOCHROME | SCAN SIZE | IMAGE QUALITY |

PLEASE SPECIFY DESIRED RESOLUTION.

○ 200dpi   ○ 300dpi   ○ 400dpi   ● 600dpi

NOTE: CONVERSION FROM A LOW RESOLUTION TO A HIGH RESOLUTION IS NOT AVAILABLE. SO, EVEN WHEN A HIGH RESOLUTION IS SPECIFIED, DATA OF THE SAME RESOLUTION AS THAT OF THE ORIGINAL IMAGE CAN BE TRANSMITTED.

APPLY

| FORMAT | PLEASE SPECIFY DESIRED FORMAT.

⦿ PDF  ○ TIFF

○ JPEG  ○ GIF

APPLY

| | |
|---|---|
| FORMAT | PLEASE SPECIFY DESIRED RESOLUTION. |
| RESOLUTION | ○ 200dpi   ● 300dpi |
| SINGLE-SIDED/ DOUBLE-SIDED | ○ 400dpi   ○ 600dpi |
| COLOR/ MONOCHROME | NOTE: CONVERSION FROM A LOW RESOLUTION TO A HIGH RESOLUTION IS NOT AVAILABLE. SO, EVEN WHEN A HIGH RESOLUTION IS SPECIFIED, DATA OF THE SAME RESOLUTION AS THAT OF THE ORIGINAL IMAGE CAN BE TRANSMITTED. |
| SCAN SIZE | |
| IMAGE QUALITY | APPLY |

WN32

APPARATUS AND METHOD FOR TRANSMITTING IMAGE DATA, AND COMPUTER-READABLE STORAGE MEDIUM FOR COMPUTER PROGRAM

This application is based on Japanese patent application No. 2009-049004 filed on Mar. 3, 2009, the contents of which are hereby incorporated by reference.

BACKGROUND OF THE INVENTION

1. Field of the Invention

The present invention relates to an apparatus such as an MFP having a function of transmitting image data, a method for transmitting image data, and the like.

2. Description of the Related Art

Image forming apparatuses having a variety of functions, such as copying, network printing (PC printing), faxing, and scanning have recently become common in offices and homes. Such image forming apparatuses are sometimes called "multifunction devices", "Multi-Function Peripherals (MFPs)", or the like.

Further, such an image forming apparatus has been equipped with a function of converting an image scanned by a scanner into an image file and transferring the image file to a device such as a personal computer. The function is generally called, for example, "Scan to E-mail" or "Scan to File Transfer Protocol (FTP)" depending on the transfer means.

Technology regarding the function is disclosed in Japanese Laid-open Patent Publication Nos. 11-069072, 2001-197248, and 2006-005491. The scanner as described below is disclosed in Japanese Laid-open Patent Publication No. 11-069072. The scanner is connected to a network. The scanner is provided with a means for selecting an image format, a means for selecting a transmission destination, and a means for enabling, e.g., a remote personal computer connected to the network, to specify selection. The scanner is also provided with a means for converting scanned data into a selected image format to transfer the resultant to a selected file server.

The image transmitting device as described below is disclosed in Japanese Laid-open Patent Publication No. 2001-197248. The image transmitting device is provided with a means that preliminarily stores file formats suitable for terminals at the other end in which mail data to be transmitted can be received by the terminals at the other end, a means that compares a file format of a file attached to a received electronic mail message to be transferred with a stored file format suitable for a terminal at the other end to which the electronic mail message should be transferred, and a means that converts, when both of the file formats thus compared differ from each other, the file format of the attached file to be transferred into the file format suitable for the terminal at the other end to which the electronic mail message should be transferred. Thus, the image transmitting device transmits the mail data whose file format has been converted to the file format suitable for the terminal at the other end to which the electronic mail message should be transferred.

The communication apparatus as described below is disclosed in Japanese Laid-open Patent Publication No. 2006-005491. The communication apparatus includes a digital interface for transmitting data in a plurality of kinds of different transmission formats corresponding to a plurality of kinds of compression formats, and acquires, from an external device connected through the digital interface, receiving format information including information indicative of a current receiving format and information indicative of the fixed state or the non-fixed state of a receiving format. When the receiving format information indicates the fixed state, a transmission format corresponding to the current receiving format is determined as the transmission format of transmission object data. When the receiving format information indicates the non-fixed state, the original transmission format of the transmission object data is determined and the transmission of the transmission object data is controlled based on the determined transmission format.

In the case of employing the technology disclosed in Japanese Laid-open Patent Publication Nos. 11-069072, 2001-197248, and 2006-005491, it is necessary for a sender to know in advance about a format suitable for a receiver. However, it is burdensome for a sender to ask a receiver about a suitable format each time.

SUMMARY

The present disclosure is directed to solve the problems pointed out above, and therefore, an object of an embodiment of the present invention is to provide a method, an apparatus, and the like that enable a sender to transmit an image in a format suitable for a receiver more easily than is conventionally possible.

According to an aspect of the present invention, an apparatus for transmitting image data, includes a first image data transmission portion that transmits first image data of a target image to be transmitted to an intended receiver to an apparatus of the intended receiver together with a URL of a web page on which a format of an image is specified, a second image data generation portion that generates second image data of the target image in the format specified on the web page, and a second image data transmission portion that transmits the second image data to the apparatus of the intended receiver.

Preferably, the apparatus further includes a specified format storage portion that stores the format specified on the web page. If the specified format storage portion stores the format therein, the first image data transmission portion may transmit, as the first image data, image data in the format.

Preferably, the apparatus further includes a web page data transmission portion that transmits, to the apparatus of the intended receiver, web page data that is data for displaying the web page.

Further, as the web page, a first web page and a second web page may be provided. The first web page is a web page on which, in addition to the format, at least one of attributes of an image resolution, a size, and a print color is specified. The second web page is a web page on which an attribute whose quantity is less than that of the attributes is specified. The web page data transmission portion may transmit, as the web page data, data for displaying the first web page if the intended receiver has a knowledge level or an experience level above a predetermined level, and may transmit, as the web page data, data for displaying the second web page if the intended receiver has a knowledge level or an experience level less than the predetermined level. The second image data generation portion may generate, as the second image data, image data in accordance with details of the attribute specified on the web page.

Preferably, if the format is specified once on the web page, followed by transmission of the second image data in the format, and then if the format is specified again, the second image data transmission portion does not transmit another piece of second image data of the target image that is a base of the second image data thus transmitted.

These and other characteristics and objects of the present invention will become more apparent by the following descriptions of preferred embodiments with reference to drawings.

BRIEF DESCRIPTION OF THE DRAWINGS

FIG. 4 is a diagram illustrating an example of user data.

FIG. 5 is a diagram illustrating an example of a condition setting screen.

FIG. 7 is a diagram illustrating an example of text information.

FIG. 8 is a diagram illustrating an example of transmission log data.

FIG. 10 is a diagram illustrating an example of a beginner setting page.

FIG. 11 is a diagram illustrating an example of an advanced user setting page.

FIG. 12 is a diagram illustrating an example of an advanced user setting page.

FIGS. 13A and 13B are modifications of a beginner setting page and an advanced user setting page.

DESCRIPTION OF THE PREFERRED EMBODIMENTS

Figure 1:
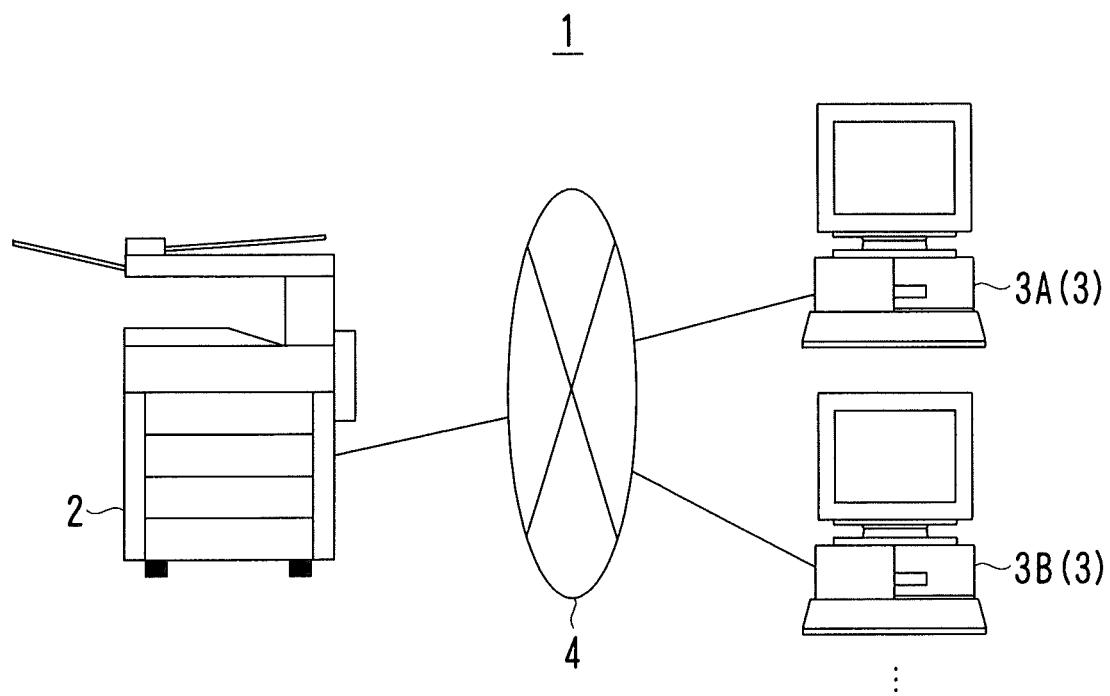
FIG. 1 is a diagram illustrating an example of the overall configuration of an image data communication system.
Figure 2:
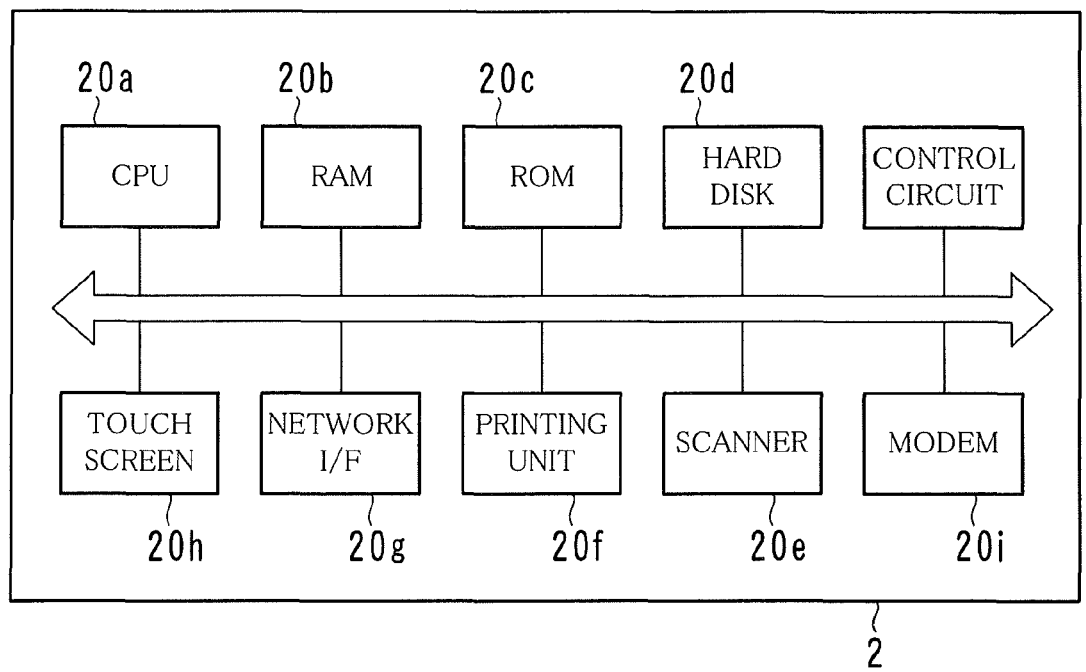
FIG. 2 is a diagram illustrating an example of the hardware configuration of an image forming apparatus.
Figure 3:
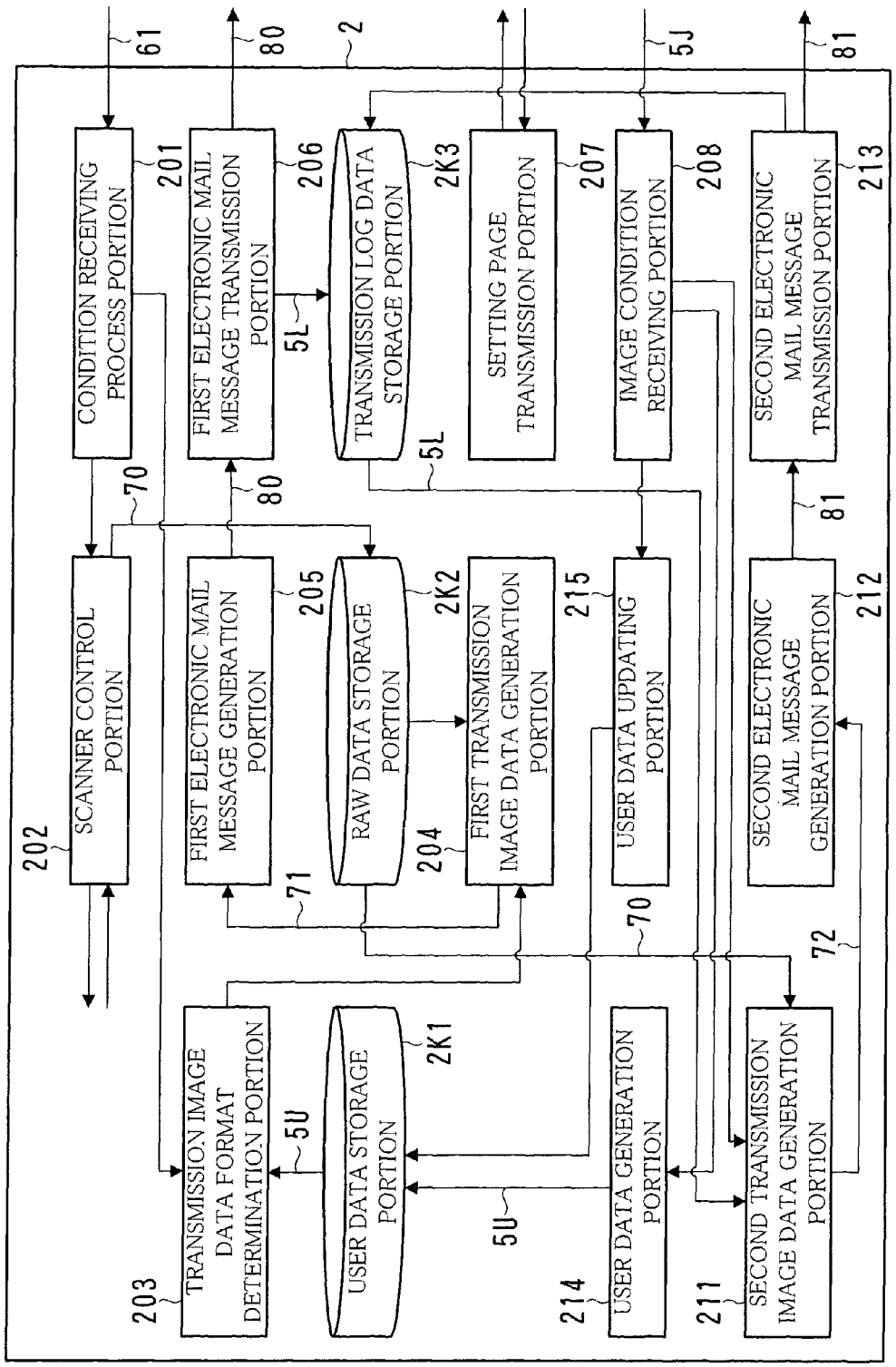
FIG. 3 is a diagram illustrating an example of the functional configuration of an image forming apparatus.

FIG. 1 is a diagram illustrating an example of the overall configuration of an image data communication system 1; FIG. 2 is a diagram illustrating an example of the hardware configuration of an image forming apparatus 2; and FIG. 3 is a diagram illustrating an example of the functional configuration of the image forming apparatus 2.

Referring to FIG. 1, the image data communication system 1 is configured of the image forming apparatus 2, a plurality of terminals 3, a communication line 4, and the like. The image forming apparatus 2 and the individual terminals 3 are configured to perform communication with one another via the communication line 4.

With the image data communication system 1, a plurality of users can convert an image represented on a paper document into electronic data, and transmit such electronic data to one another and vice versa.

The image forming apparatus 2 is an apparatus generally called a multifunction device, a Multi-Function Peripheral (MFP), or the like. The image forming apparatus 2 is configured to integrate, thereinto, a variety of functions, such as copying, faxing, network printing, and network scanning.

The network scanning function is a function to transmit, to another device, image data of an image represented on paper obtained by scanning with a scanner. A function to attach image data to an electronic mail message and transmit the electronic mail message, which is a part of the network scanning function, is particularly called "Scan to E-mail" in some cases.

Referring to FIG. 2, the image forming apparatus 2 is configured of a Central Processing Unit (CPU) 20a, a Random Access Memory (RAM) 20b, a Read-Only Memory (ROM) 20c, a hard disk 20d, a scanner 20e, a printing unit 20f, a network interface 20g, a touch screen 20h, a modem 20i, a variety of control circuits, and so on.

The scanner 20e is a device that reads images printed on paper, such as photographs, characters, drawings, diagrams, and the like, and creates image data thereof.

The printing unit 20f serves to print, onto paper, an image obtained by scanning with the scanner 20e or an image included in image data received from another device.

The touch screen 20h displays, for example, a screen for giving a message or instructions to a user, a screen for the user to enter a process command and process conditions, and a screen for displaying the result of a process performed by the CPU 20a. The touch screen 20h also detects a position thereof touched by the user with his/her finger and sends a signal indicating the result of the detection to the CPU 20a.

The network interface 20g is a Network Interface Card (NIC) for communicating with another device such as the terminal 3 according to Transmission Control Protocol/Internet Protocol (TCP/IP) via the communication line 4.

The modem 20i is a device for transmitting image data via a fixed-line telephone network to another facsimile terminal and vice versa based on a protocol such as Group 3 (G3).

Referring to FIG. 3, the ROM 20c or the hard disk 20d stores programs and data for implementing functions of a condition receiving process portion 201, a scanner control portion 202, a transmission image data format determination portion 203, a first transmission image data generation portion 204, a first electronic mail message generation portion 205, a first electronic mail message transmission portion 206, a setting page transmission portion 207, an image condition receiving portion 208, a second transmission image data generation portion 211, a second electronic mail message generation portion 212, a second electronic mail message transmission portion 213, a user data generation portion 214, a user data updating portion 215, a user data storage portion 2K1, a raw data storage portion 2K2, a transmission log data storage portion 2K3, and the like. These programs and data are loaded into the RAM 20b as necessary, whereupon the programs are executed by the CPU 20a. The individual portions of the image forming apparatus 2 illustrated in FIG. 3 primarily perform a process for providing a user with a network scanning service.

Referring back to FIG. 1, the terminal 3 is a client to which the image forming apparatus 2 provides a network scanning service. A device provided with a mailer and a web browser is used as the terminal 3. Examples of the terminal 3 include a personal computer, a Personal Digital Assistant (PDA), or a mobile phone terminal.

Figure 6:
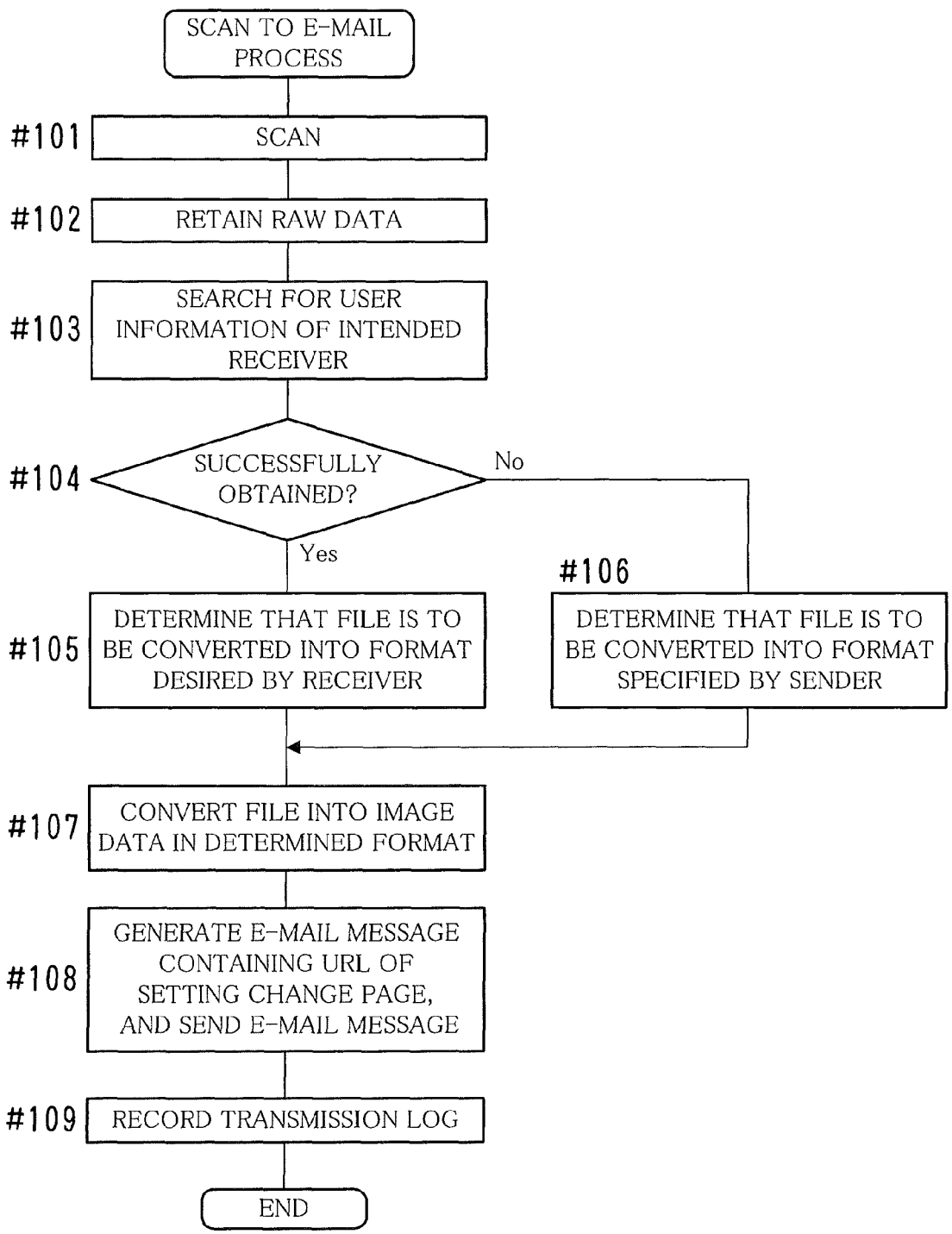
FIG. 6 is a flowchart illustrating an example of the flow of a Scan to E-mail process.
Figure 9:
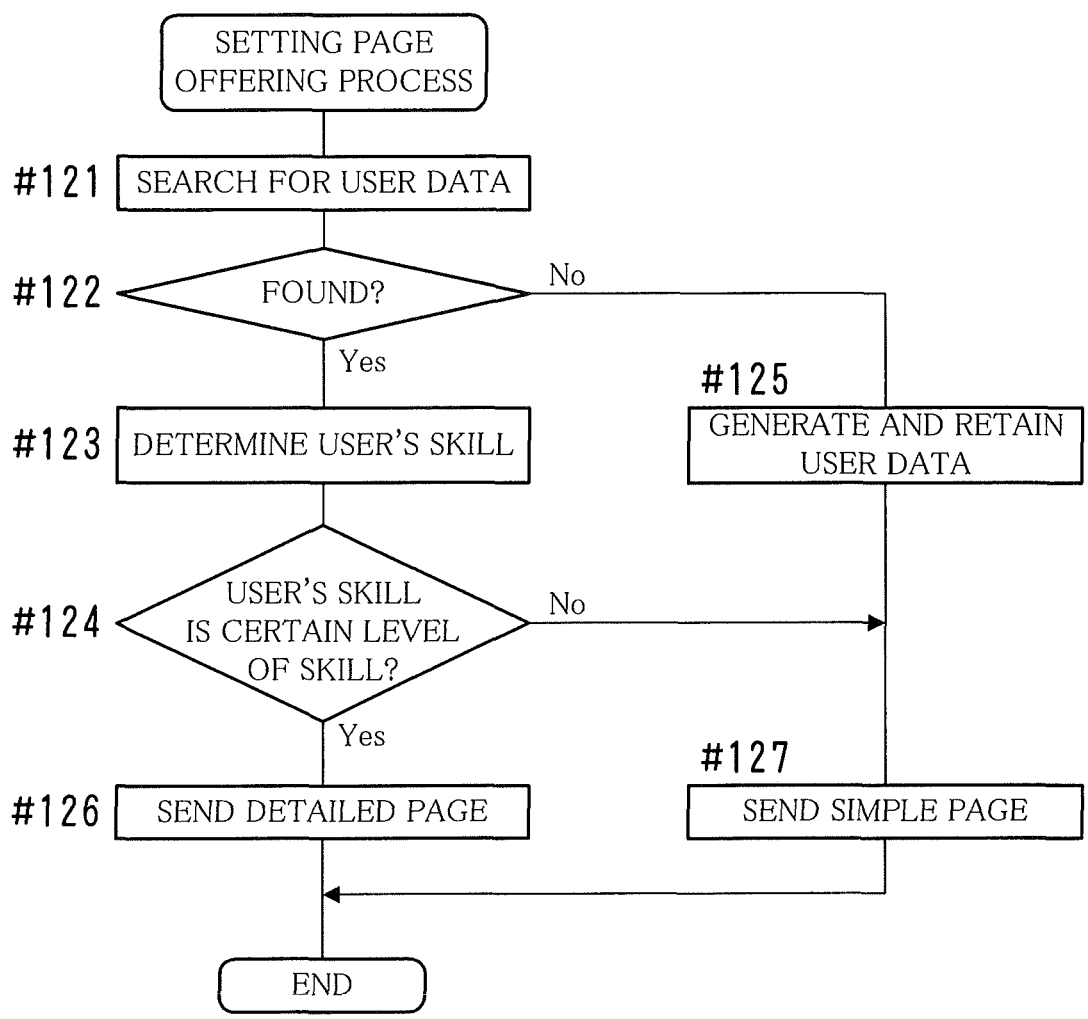
FIG. 9 is a flowchart illustrating an example of the flow of a setting page offering process.
Figure 14:
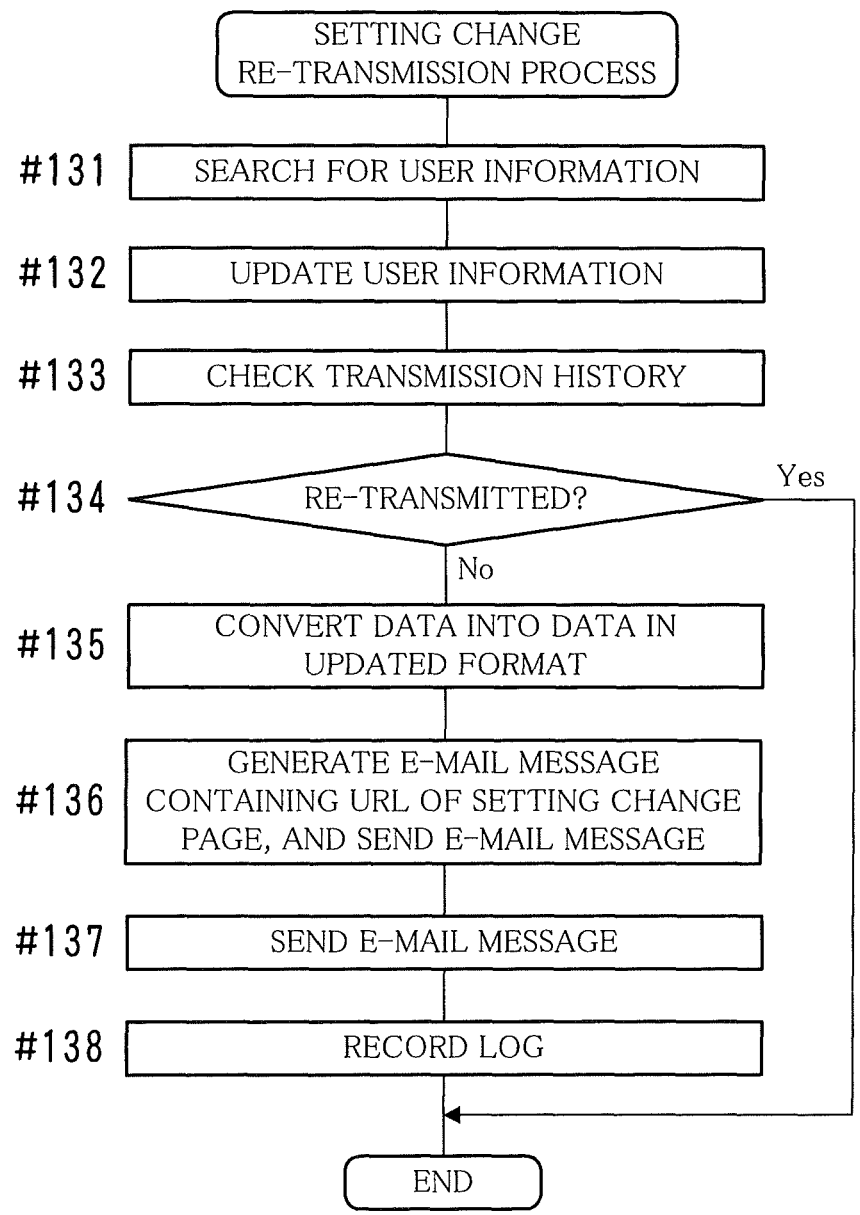
FIG. 14 is a flowchart illustrating an example of the flow of a setting change re-transmission process.

FIG. 4 is a diagram illustrating an example of user data 5U; FIG. 5 is a diagram illustrating an example of a condition setting screen WN21; FIG. 6 is a flowchart illustrating an example of the flow of a Scan to E-mail process; FIG. 7 is a diagram illustrating an example of text information 802; FIG. 8 is a diagram illustrating an example of transmission log data 5L; FIG. 9 is a flowchart illustrating an example of the flow of a setting page offering process; FIG. 10 is a diagram illustrating an example of a beginner setting page WN31; FIGS. 11 and 12 are diagrams illustrating an example of an advanced user setting page WN32; FIGS. 13A and 13B are modifications of the beginner setting page WN31 and the advanced user setting page WN32; and FIG. 14 is a flowchart illustrating an example of the flow of a setting change re-transmission process.

The following is the details of processes performed by the individual portions of the image forming apparatus 2 illustrated in FIG. 3.

Referring to FIG. 3, the user data storage portion 2K1 stores, therein, user data 5U on a user-by-user basis as shown in FIG. 4. The user data 5U includes a user code for identifying a user given the subject user data 5U, an image data format desired by the user, image conditions desired by the user, and an electronic mail address of the user. As described later, the image data format herein is used as a format of image data to be transmitted to the user.

The user data 5U also indicates to what extent the user has skill in operation of an MFP or to what extent the user is familiar with operation of the MFP (hereinafter, such an extent is referred to as a "skill level"). In the illustrated example of FIG. 4, the level "A" means that the user has skill above a certain level, i.e., the user is an advanced user, while the level "B" means that the user has skill less than the certain level, i.e., the user is a beginner.

Descriptions are provided later as to how the user data 5U is generated, how the user data 5U is stored in the user data storage portion 2K1, and how the user data 5U is updated.

Referring back to FIG. 3, the condition receiving process portion 201 performs a process for receiving, from a user who is a sender, conditions regarding scanning and transmission of image data obtained by scanning, and so on, in the following manner.

The sender places original document on a feeder of the scanner 20e and operates the touch screen 20h to enter a predetermined command. Responding to this, the condition receiving process portion 201 causes the touch screen 20h to display the condition setting screen WN21 as that illustrated in FIG. 5.

The sender specifies, on the condition setting screen WN21, an electronic mail address of a user as the transmission destination of the image data, i.e., a receiver, and an image scanning resolution. The sender also specifies, on the condition setting screen WN21, a format to be used for a case in which the user data storage portion 2K1 does not store therein user data 5U of the receiver, or a case in which no format is indicated in the user data 5U of the receiver.

After specifying the details of these items, the sender presses an "APPLY" button. Responding to this, the condition receiving process portion 201 receives, as specified condition information 61, the details thus specified.

The scanner control portion 202, the transmission image data format determination portion 203, the first transmission image data generation portion 204, the first electronic mail message generation portion 205, and the first electronic mail message transmission portion 206 perform a process for transmitting an image to an intended receiver in accordance with a condition specified by a sender. The processes performed by the individual portions are described below with reference to the flowchart of FIG. 6.

When the condition receiving process portion 201 receives specified condition information 61 and then a START button is pressed, the scanner control portion 202 controls the scanner 20e to scan an image represented on the original document placed on the feeder (#101 of FIG. 6). Thereby, image data, which is so-called raw data, is obtained.

The image data is converted into a file and the file is given a unique file name, so that the file is stored (retained) in the raw data storage portion 2K2 (#102). Hereinafter, image data that is obtained by the scanner 20e and is converted into a file is referred to as an "image file 70". Note that the image file 70 is deleted after a predetermined amount of time, e.g., one week, has elapsed since the image file 70 was retained in the raw data storage portion 2K2.

The transmission image data format determination portion 203 determines into which format the image file 70 is converted before transmission, in the following manner. The transmission image data format determination portion 203 searches in the user data storage portion 2K1 for user data 5U including the electronic mail address of the receiver received by the condition receiving process portion 201 (#103). If such user data 5U is found by the search (Yes in #104), then the transmission image data format determination portion 203 determines that the image file 70 is to be converted in a format indicated in the field of "desired format" of the user data 5U (#105). In contrast, if such user data 5U is not found by the search (No in #104), then the transmission image data format determination portion 203 determines that the image file 70 is to be converted in the format received by the condition receiving process portion 201, i.e., the format specified by the sender (#106).

The first transmission image data generation portion 204 calls the image file 70 to be transmitted from the raw data storage portion 2K2, and converts the image file 70 into the format determined by the transmission image data format determination portion 203 (#107). Hereinafter, an image file 70 that has been converted into a determined format is referred to as an "image file 71". In the case where, for example, the determined format is a Portable Document Format (PDF), the first transmission image data generation portion 204 generates an image file 71 in PDF.

In the case where the user data 5U includes an image condition, the first transmission image data generation portion 204 generates an image file 71 in accordance with the image condition. In the case where, for example, the condition of "monochrome" is indicated as the image condition, the first transmission image data generation portion 204 generates an image file 71 of a monochrome image. Cases in which the other conditions are indicated will be described later.

The first electronic mail message generation portion 205 generates an electronic mail message 80 consisting of attribute information 801, text information 802, and an attachment file 803 (#108).

The attribute information 801 indicates an electronic mail address of a sender, an electronic mail address of a receiver, a title, and so on. An image file 71 is used as the attachment file 803.

The text information 802 indicates a text of the electronic mail message, that is, a message. The details of the title and the message may be entered by the sender on a screen for entry thereof displayed on the touch screen 20h. Alternatively, a template prepared in advance may be used to enter the title and the message.

The text information 802 also indicates a Uniform Resource Locator (URL) through which access is made to a web page for setting a format, and the like (that is, a setting page described later), and a message for informing a receiver of the setting page. The URL indicates the following: a page name of the setting page; a domain name and a server name of a website providing the setting page; a file name of an image file 70 that is the base of the image file 71 to be transmitted as an attachment of the electronic mail message 80; and an electronic mail address of a receiver. Supposing that, for example, the page name of the setting page is "setting.html", the domain name is "domain-a.co.xxx", the server name is "www", the file name of the image file 70 is "080121001", and the electronic mail address of the receiver is "aaa@xx.yy.zzz". In such a case, the text information 802 indicates the following URL: http://www.domain-a.co.xxx/setting.html?file=080121001&address=aaa@xx.yy.zzz.

The first electronic mail message transmission portion 206 transmits the electronic mail message 80 generated by the first electronic mail message generation portion 205 to the electronic mail address received by the condition receiving process portion 201.

Upon doing so, transmission log data 5L is generated and stored in the transmission log data storage portion 2K3 (#109). The transmission log data 5L includes the electronic mail address of the receiver and the file name of the image file 70 that is the base of the image file 71 used as an attachment file (the attachment file 803) of the electronic mail message 80. The transmission log data storage portion 2K3 stores therein transmission log data 5L every time when Scan to E-mail operation is performed, resulting in the accumulation of a multiple pieces of transmission log data 5L as illustrated in FIG. 8.

The transmission log data 5L further includes the field of "number of occurrences". The field indicates the number of occurrences of this transmission of an image file 71, which is generated based on the image file 70 having the file name indicated in the transmission log data 5L, to the electronic mail address indicated in the transmission log data 5L.

It is assumed that the image file 71 that is attached, as the attachment file 803, to the electronic mail message 80 and is transmitted by the first electronic mail message transmission portion 206 is to be transmitted to the electronic mail address of the receiver for the first time. Thus, the value of the "number of occurrences" field is determined to be "1".

The electronic mail message 80 is delivered to a terminal 3 of the intended receiver via, for example, an electronic mail server. Responding to this, the terminal 3 starts a mailer and displays the text information 802 of the electronic mail message 80 as illustrated in FIG. 7. Further, an icon for representing the attachment file 803, that is, the image file 71, is displayed. If the icon is clicked on, the terminal 3 opens the image file 71 by an application such as a web browser, drawing software, or a viewer, and displays the image.

However, unless an application corresponding to the format of the image file 71 is installed on the terminal 3, it is impossible for the terminal 3 to open the image file 71. Alternatively, even if the terminal 3 is capable of opening the image file 71, it is possible that the receiver of the electronic mail message 80 desires another format. In such cases, the receiver can access the setting page to specify his/her desired format. The receiver can access the setting page by, for example, clicking on the URL included in the text information 802.

Then, the terminal 3 starts the web browser and requests the image forming apparatus 2 for the setting page based on the URL. At this time, the file name and the electronic mail address indicated in the URL are informed to the image forming apparatus 2.

Referring to FIG. 3, upon the request from the terminal 3, the setting page transmission portion 207 of the image forming apparatus 2 transmits setting page data (an HTML file, for example) to the terminal 3 in the manner as shown in FIG. 9.

The setting page transmission portion 207 searches in the user data storage portion 2K1 (see FIG. 4) for user data 5U including the electronic mail address informed by the terminal 3 (#121 of FIG. 9).

If such user data 5U is not found by the search (No in #122), then the setting page transmission portion 207 transmits as the setting page data, to the terminal 3 as the request source, data on the beginner setting page WN31 (see FIG. 10) that is a setting page for beginners (#127). At this time, the user data generation portion 214 issues a new unique user code for the user as the request source, i.e., the requestor (the receiver of the electronic mail message 80), generates user data 5U including the new user code and the electronic mail address informed by the terminal 3, and stores the generated user data 5U in the user data storage portion 2K1 (#125). The initial value of the skill level is "B". The desired format is not set at this time.

In contrast, if such user data 5U is found by the search (Yes in #122), then the setting page transmission portion 207 transmits setting page data suitable for the requestor (the receiver of the electronic mail message 80) in the following manner.

The setting page transmission portion 207 checks a skill level indicated in the user data 5U found by the search (#123).

If the level "A" is indicated as the skill level (Yes in #124), then the setting page transmission portion 207 transmits as the setting page data, to the terminal 3 as the request source, data on the advanced user setting page WN32 (see FIG. 11) that is a setting page for advanced users (#126). In contrast, if the level "B" is indicated as the skill level (No in #124), then the setting page transmission portion 207 transmits, to the terminal 3 as the request source, data on the beginner setting page WN31 (#127).

As apparent from the comparison between FIG. 10 and FIG. 11, the beginner setting page WN31 and the advanced user setting page WN32 differ from each other in items to be specified. Specifically, a user can specify a desired format on both the beginner setting page WN31 and the advanced user setting page WN32. However, the user can specify, on the beginner setting page WN31, only a desired format while the user can specify, on the advanced user setting page WN32, the desired format, and other different items by pressing a tab corresponding to an item to be specified to switch from one tabbed page to another.

For example, when the user presses the "resolution" tab on the advanced user setting page WN32, the display thereon can be switched to a tabbed page for specifying an image resolution as shown in FIG. 12. At this time, the setting page transmission portion 207 transmits data on a page for specifying an image resolution to the terminal 3. Thereby, the user can specify a desired resolution. Further, the user can press another tab on the advanced user setting page WN32 and switch from one tabbed page to another, so that he/she can specify a print color (for example, color or monochrome), a scan size, an image quality, and so on.

Note that displays of items to be specified may be changed by using buttons instead of by using tabs. In such a case, the beginner setting page WN31 and the advanced user setting page WN32 may be displayed respectively as illustrated in FIG. 13A and FIG. 13B.

The user specifies a desired format on the beginner setting page WN31 or the advanced user setting page WN32. The user further specifies, if necessary, a desired image resolution or the like on the advanced user setting page WN32.

Referring back to FIG. 3, the image condition receiving portion 208 receives, from the terminal 3, image condition data 5J indicating the details specified on the beginner setting page WN31 or the advanced user setting page WN32.

When the image condition data 5J is received from the terminal 3, the second transmission image data generation portion 211, the second electronic mail message generation portion 212, the second electronic mail message transmission portion 213, and the user data updating portion 215 perform a process for updating the user data 5U of the user as the transmission source and a process for re-transmitting an electronic mail message according to the steps shown in FIG. 14.

The user data updating portion 215 searches in the user data storage portion 2K1 (see FIG. 4) for the user data 5U of the user who has specified the format, and so on, i.e., the user data 5U including the electronic mail address informed by the terminal 3 of the user (#131 of FIG. 14). The user data updating portion 215 then updates the details of the format and conditions of the user data 5U with the details indicated in the image condition data 5J (#132).

In the case where, for example, the image condition data 5J indicates "JPEG" and "600 dpi, monochrome" respectively as the format and the condition, the user data updating portion 215 updates the details in the "desired format" field of the user data 5U with "JPEG", and the details in the "conditions" field thereof with "600 dpi, monochrome".

The second transmission image data generation portion 211 searches in the transmission log data storage portion 2K3 (see FIG. 8) for the transmission log data 5L including the file name and the electronic mail address both of which have been informed by the terminal 3 of the user who has specified the format, and so on. Then, the second transmission image data generation portion 211 checks the number of occurrences indicated in the transmission log data 5L (#133).

If "1" is indicated in the "number of occurrences" field of the transmission log data 5L, in other words, if an image file 71 has never been re-generated based on the image file 70 indicated in the transmission log data 5L and the image file 70 has never been transmitted to the electronic mail address included in the transmission log data 5L (No in #134), then the second transmission image data generation portion 211 re-generates an image file 71 in the following manner (#135). Note that an image file 71 generated by the second transmission image data generation portion 211 is hereinafter referred to as an "image file 72" in order to distinguish the image file 71 from an image file 71 generated by the first transmission image data generation portion 204.

The second transmission image data generation portion 211 calls, from the raw data storage portion 2K2, an image file 70 to which the file name indicated in the transmission log data 5L is given. The second transmission image data generation portion 211 performs image processing on the image file 70 based on the condition indicated in the user data 5U updated in Step #132. The second transmission image data generation portion 211 then converts the image file 70 subjected to the image processing into the format indicated in the user data 5U.

The second electronic mail message generation portion 212 generates an electronic mail message 81 consisting of attribute information 811, text information 812, and an attachment file 813 (#136).

The attribute information 811 indicates an electronic mail address of a sender, an electronic mail address of a receiver, a title, and so on. The electronic mail address of a sender may be an electronic mail address of a user who has caused the scanner 20e to scan the original image file 70, or may be an electronic mail address of the image forming apparatus 2. The electronic mail address of a receiver is the electronic mail address informed by the terminal 3, i.e., the electronic mail address of the user who has specified the format, and so on.

The text information 812 indicates a text of the electronic mail message, that is, a message. The details of the title and the message are preferably entered by using the details of a template prepared in advance.

The text information 812 also indicates a URL through which access is made to a setting page (the beginner setting page WN31 or the advanced user setting page WN32), and a message for informing the receiver of the setting page.

The image file 72 re-generated by the second transmission image data generation portion 211 is used as the attachment file 813.

The second electronic mail message transmission portion 213 transmits the electronic mail message 81 generated by the second electronic mail message generation portion 212 to the electronic mail address of the user who has specified the format, and so on (#137). After the transmission, the value of the "number of occurrences" indicated in the transmission log data 5L is updated to "2" (#138).

On the other hand, if the second transmission image data generation portion 211 checks that "2" is indicated in the "number of occurrences" field of the transmission log data 5L (Yes in #134), then a process for re-generating the image file 71 (72) and a process for transmitting the electronic mail message 81 are not carried out. Stated differently, only a process for updating the user data 5U is carried out.

The following is an example of image processing carried out based on the condition specified by the user in Step #135.

In the case where the image file 70 is an image file of a color image and "monochrome" is specified as the color/monochrome condition, the image file 70 is converted into an image file 72 of a monochrome image.

Alternatively, in the case where the image file 70 is an image file of a 600 dpi image and "200 dpi" is specified as the resolution condition, the image file 70 is converted into an image file 72 of a 200 dpi image.

Alternatively, in the case where the image file 70 is an image file of an image read out from A3-sized paper and "A4" is specified as the scan size condition, the image file 70 is converted into an image file 72 of an image reduced to A4 size.

Yet alternatively, in the case where "map" is specified as the image quality condition, the image file 70 is converted into an image file 72 of an image having an image quality suitable for a map. Likewise, in the case where "copy image" is specified as the image quality condition, the image file 70 is converted into an image file 72 of an image having an image quality suitable for copying (duplicate). In the case where "character" is specified as the image quality condition, the image file 70 is converted into an image file 72 of an image having an image quality suitable for a document containing many characters.

Figure 15:
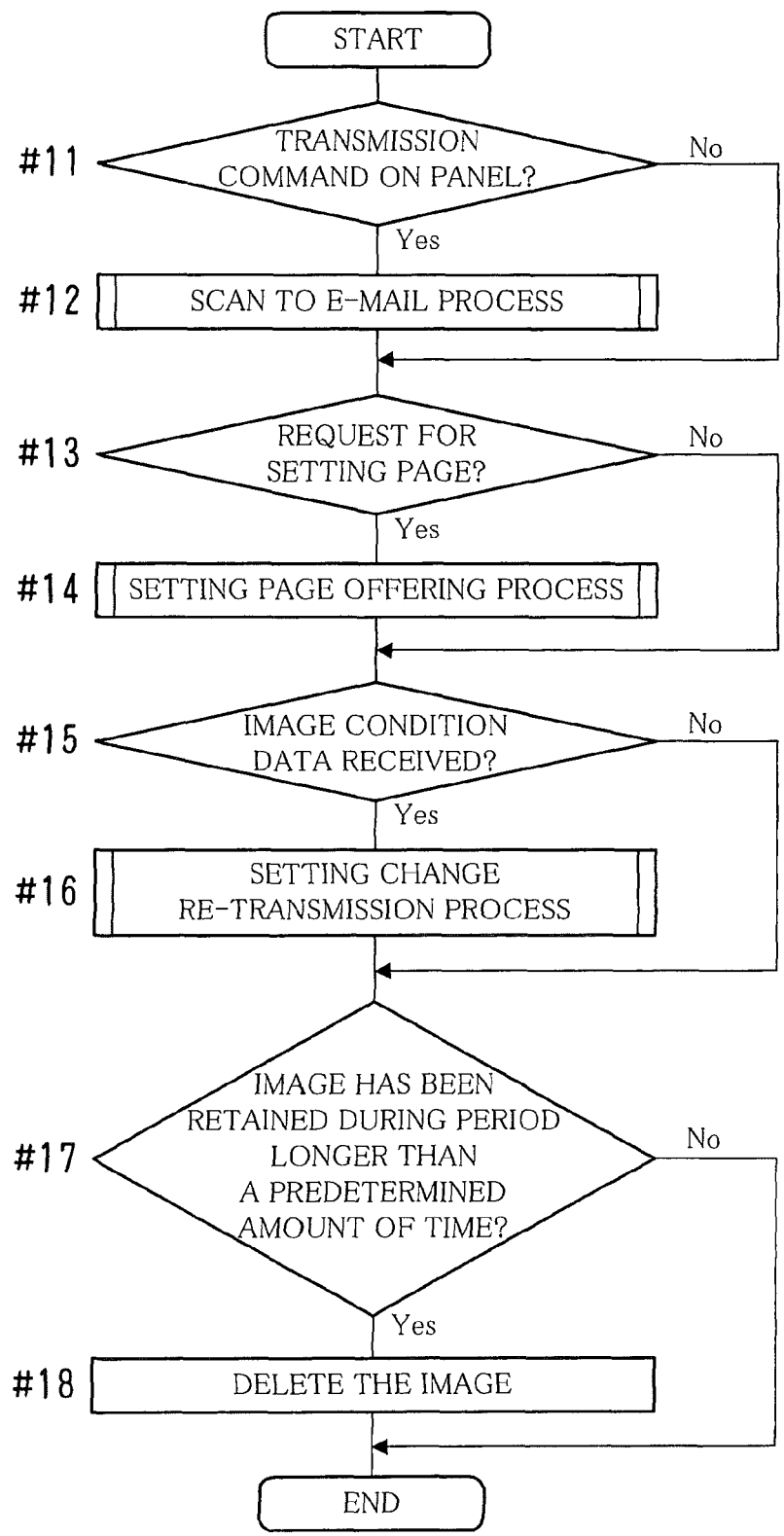
FIG. 15 is a flowchart illustrating an example of the overall processing flow of an image forming apparatus.

FIG. 15 is a flowchart illustrating an example of the overall processing flow of the image forming apparatus 2. The overall processing flow of the image forming apparatus 2 is described below with reference to the flowchart of FIG. 15.

While offering a service, the image forming apparatus 2 performs the process described below in response to the occurrence of an event.

When a user performs Scan to E-mail operation (Yes in #11 of FIG. 15), the image forming apparatus 2 performs a process for scanning an image to be transmitted, a process for generating an image file 70 and an image file 71, and a process for transmitting the image file 71 to an electronic mail address of a receiver (#12). The processes were detailed earlier with reference to FIG. 6.

When a request for setting page is received from a terminal 3 (Yes in #13), the image forming apparatus 2 transmits, to the terminal 3, data (an HTML file, for example) for displaying either the beginner setting page WN31 or the advanced user setting page WN32 depending on a skill level of a requestor (#14). The transmission process was detailed earlier with reference to FIG. 9.

When image condition data 5J is received from the terminal 3 (Yes in #15), the image forming apparatus 2 performs a process for updating user data 5U of a user who has transmitted the image condition data 5J, a process for generating, if necessary, an image file 72, and a process for transmitting the image file 72 (#16). The details of the processes were provided earlier with reference to FIG. 14.

Further, the image forming apparatus 2 periodically checks a retention period of each of the image files 70 stored (retained) in the raw data storage portion 2K2. If the image forming apparatus 2 founds an image file 70 that has been retained in the raw data storage portion 2K2 during a period longer than a predetermined amount of time (Yes in #17), then the image forming apparatus 2 deletes the image file 70 therefrom (#18).

In the present embodiment, image data is transmitted to a receiver together with an electronic mail message containing a URL of a setting page. The receiver may access the setting page to specify a format only when he/she desires image data in a format other than the format of the received image data. This makes it possible for a sender to transmit an image in a format suitable for a receiver more easily than is conventionally possible. A receiver thus may specify a format only when a need arises, which makes it possible for the receiver to receive image data in a desired format more easily than is conventionally possible.

A user can access a setting page and re-specify a format, and so on at any time, as many times as he/she desires based on a URL contained in the electronic mail message 80 and the electronic mail message 81 received by him/her. As described above, however, once the user receives an image file 72 whose base is an image file 70, he/she will never receive an image file 72 whose base is the identical image file 70. Because of this, even when, for example, a user receives an image file 72 in a format different from a usually used format at a business destination depending on the environment thereof, and then returns the format of the image file 72 to the usually used format before leaving the business destination, he/she will never receive again an image file 72 in the usually used format thus returned. Thus, unnecessary receiving can be reduced.

[Modification]

Figure 16:
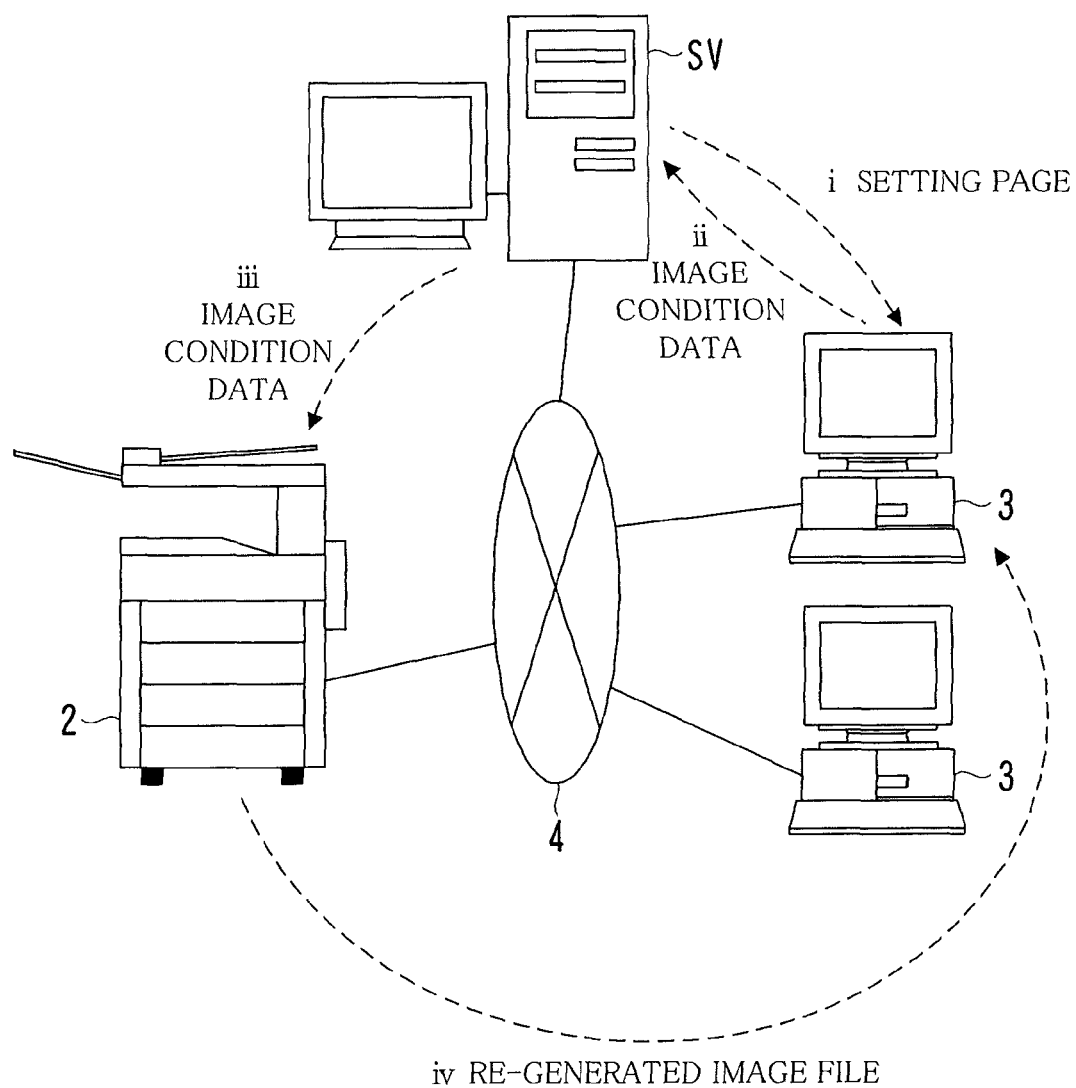
FIG. 16 is a modification of an image data communication system.

FIG. 16 is a modification of the image data communication system 1.

In the embodiment discussed above, the image forming apparatus 2 is equipped with not only a Scan to E-mail function but also a web server function. In another arrangement, the web server function is transferred to a server machine SV as shown in FIG. 16.

To be specific, the server machine SV is preferably provided with the setting page transmission portion 207 and the image condition receiving portion 208 illustrated in FIG. 3. The server machine SV is preferable to transfer, to the image forming apparatus 2, image condition data 5J received from a terminal 3 together with a file name and an electronic mail address informed by the terminal 3. The second transmission image data generation portion 211, the second electronic mail message generation portion 212, the second electronic mail message transmission portion 213, and the user data generation portion 214 of the image forming apparatus 2 are preferable to perform a process for generating an image file 72 and transmitting the image file 72 generated, and a process for updating user data 5U based on, for example, the image condition data 5J transferred by the server machine SV.

In the embodiment discussed above, a user who has received an electronic mail message 80 or an electronic mail message 81 transmits image condition data 5J to the image forming apparatus 2 through the beginner setting page WN31 or the advanced user setting page WN32. In another arrangement, the image condition data 5J may be transmitted through electronic mail. In such a case, it is preferable that format options and condition options of individual items are indicated in text information 802 or text information 812 of an electronic mail message 80 or an electronic mail message 81, and the user replies to the electronic mail message 80 or the electronic mail message 81, so that the image condition data 5J is transmitted to the image forming apparatus 2.

In the embodiment discussed above, in the case where there is no user data 5U of a receiver, a sender determines a format of an image file 71 (see FIG. 5). Instead, however, it is possible that a default format is determined in advance.

In the embodiment discussed above, the image forming apparatus 2 stores raw data as an image file 70. Instead, however, the image forming apparatus 2 may store image data in a Joint Photographic Experts Group (JPEG) format, etc.

The items that can be set (specified) on the beginner setting page WN31 and the advanced user setting page WN32 are variably configured. In the embodiment described above, a user is not allowed to specify a resolution on the beginner setting page WN31. Instead, however, the beginner setting page WN31 may be configured to enable a user to specify a resolution. Alternatively, setting pages may be provided depending on three or more different levels.

The skill level may be determined based on the length of a period during which a user has used an image forming apparatus 2. The length of a period can be calculated starting from the date at which an account of a user is registered in an image forming apparatus 2. Alternatively, the skill level may be determined based on the depth of knowledge level of an image forming apparatus 2 by a user. The depth of knowledge level can be determined by, for example, conducting a test.

In the embodiment discussed above, the overall configurations of the image data communication system 1 and the image forming apparatus 2, the configurations of various portions thereof, the content to be processed, the processing order, the structure of data, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An apparatus for transmitting image data, comprising:
   a transmission image data format determination portion that determines a predetermined format in which a target image is to be transmitted;
   a first image data transmission portion that transmits first image data of the target image in the predetermined format to be transmitted to an intended receiver to an apparatus of the intended receiver together with a URL of a web page on which a format of an image other than the predetermined format is specified;
   a second image data generation portion that generates second image data of the target image in the format specified on the web page; and
   a second image data transmission portion that transmits the second image data to the apparatus of the intended receiver.

2. The apparatus according to claim 1, further comprising a specified format storage portion that stores therein the format specified on the web page in association with the apparatus of the intended receiver,
   wherein, if the specified format storage portion stores the format therein corresponding to the apparatus of the intended receiver that is a destination, the transmission image data format determination portion determines the format stored in the specified format storage portion to be the predetermined format.

3. The apparatus according to claim 1, further comprising a web page data transmission portion that transmits, to the apparatus of the intended receiver, web page data that is data for displaying the web page.

4. The apparatus according to claim 3,
wherein, as the web page, a first web page and a second web page are provided, the first web page being a web page on which, in addition to the format, at least one of attributes of an image resolution, a size, and a print color is specified, the second web page being a web page on which an attribute whose quantity is less than that of said attributes is specified,
the web page data transmission portion transmits, as the web page data, data for displaying the first web page if the intended receiver has a knowledge level or an experience level above a predetermined level, and transmits, as the web page data, data for displaying the second web page if the intended receiver has a knowledge level or an experience level less than the predetermined level, and
the second image data generation portion generates, as the second image data, image data in accordance with details of the attribute specified on the web page.

5. The apparatus according to claim 1, wherein, if the format is specified once on the web page, followed by transmission of the second image data in the format, and then if the format is specified again, the second image data transmission portion does not transmit another piece of second image data of the target image that is a base of the second image data thus transmitted.

6. The apparatus according to claim 1, further comprising a target image deletion portion that deletes a file of the target image from a storage portion after a predetermined amount of time has elapsed since the first image data transmission portion transmitted the first image data to the apparatus of the intended receiver.

7. A method for transmitting image data, comprising:
a first step of determining a predetermined format in which a target image is to be transmitted;
a second step of transmitting first image data of the target image in the predetermined format to be transmitted to an intended receiver to an apparatus of the intended receiver together with a URL of a web page on which a format of an image other than the predetermined format is specified;
a third step of generating second image data of the target image in the format specified on the web page; and
a fourth step of transmitting the second image data to the apparatus of the intended receiver.

8. The method according to claim 7, further comprising a fifth step of storing the format specified on the web page in a specified format storage portion in association with the apparatus of the intended receiver,
wherein, if the specified format storage portion stores the format therein corresponding to the apparatus of the intended receiver that is a destination, the first step includes determining the format stored in the specified format storage portion to be the predetermined format.

9. The method according to claim 7, further comprising a sixth step of transmitting, to the apparatus of the intended receiver, web page data that is data for displaying the web page.

10. The method according to claim 9,
wherein, if a first web page and a second web page are provided as the web page, the first web page being a web page on which, in addition to the format, at least one of attributes of an image resolution, a size, and a print color is specified, the second web page being a web page on which an attribute whose quantity is less than that of said attributes is specified,
the sixth step includes transmitting, as the web page data, data for displaying the first web page if the intended receiver has a knowledge level or an experience level above a predetermined level, and transmitting, as the web page data, data for displaying the second web page if the intended receiver has a knowledge level or an experience level less than the predetermined level, and
the a third step includes generating, as the second image data, image data in accordance with details of the attribute specified on the web page.

11. The method according to claim 7, wherein, if the format is specified once on the web page, followed by transmission of the second image data in the format, and then if the format is specified again, another piece of second image data of the target image that is a base of the second image data thus transmitted is not transmitted.

12. The method according to claim 7, further comprising a seventh step of deleting a file of the target image from a storage portion after a predetermined amount of time has elapsed since the second step of transmitting the first image data to the apparatus of the intended receiver.

13. A non-transitory computer-readable storage medium storing thereon a computer program used in a computer equipped with a function of transmitting image data, the computer program causing the computer to perform:
a first process of determining a predetermined format in which a target image is to be transmitted;
a second process of transmitting first image data of the target image in the predetermined format to be transmitted to an intended receiver to an apparatus of the intended receiver together with a URL of a web page on which a format of an image other than the predetermined format is specified;
a third process of generating second image data of the target image in the format specified on the web page; and
a fourth process of transmitting the second image data to the apparatus of the intended receiver.

14. The non-transitory computer-readable storage medium according to claim 13, the computer program causing the computer to further perform a fifth process of storing the format specified on the web page in a specified format storage portion in association with the apparatus of the intended receiver,
wherein, if the specified format storage portion stores the format therein corresponding to the apparatus of the intended receiver that is a destination, the first process includes determining the format stored in the specified format storage portion to be the predetermined format.

15. The non-transitory computer-readable storage medium according to claim 13, the computer program causing the computer to further perform a sixth process of transmitting, to the apparatus of the intended receiver, web page data that is data for displaying the web page.

16. The non-transitory computer-readable storage medium according to claim 15,
wherein, if a first web page and a second web page are provided as the web page, the first web page being a web page on which, in addition to the format, at least one of attributes of an image resolution, a size, and a print color is specified, the second web page being a web page on which an attribute whose quantity is less than that of said attributes is specified, the computer program causing the computer, as the sixth process, to transmit, as the web page data, data for displaying the first web page if the intended receiver has a knowledge level or an experience level above a predetermined level, and to transmit, as the web page data, data for displaying the second web page if the intended receiver has a knowledge level or an experience level less than the predetermined level, and the computer program causing the computer, as the third process, to generate, as the second image data, image data in accordance with details of the attribute specified on the web page.

17. The non-transitory computer-readable storage medium according to claim 13, wherein the computer program controls the computer in such a manner that if the format is specified once on the web page, followed by transmission of the second image data in the format, and then if the format is specified again, another piece of second image data of the target image that is a base of the second image data thus transmitted is not transmitted.

18. The non-transitory computer-readable storage medium according to claim 13, the computer program causing the computer to further perform a seventh process of deleting a file of the target image from a storage portion after a predetermined amount of time has elapsed since the second step of transmitting the first image data to the apparatus of the intended receiver.

* * * * *